(12) United States Patent
Yamamoto

(10) Patent No.: US 7,267,792 B2
(45) Date of Patent: Sep. 11, 2007

(54) INJECTION CO-MOLDING WITH OFFSET PARTING LINE

(75) Inventor: Hiroaki Yamamoto, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 46 days.

(21) Appl. No.: 10/297,906

(22) PCT Filed: May 31, 2001

(86) PCT No.: PCT/US01/17547

§ 371 (c)(1),
(2), (4) Date: Apr. 15, 2003

(87) PCT Pub. No.: WO01/96087

PCT Pub. Date: Dec. 20, 2001

(65) Prior Publication Data

US 2003/0215614 A1    Nov. 20, 2003

Related U.S. Application Data

(60) Provisional application No. 60/211,040, filed on Jun. 12, 2000.

(51) Int. Cl.
*B29C 45/14* (2006.01)

(52) U.S. Cl. ............ 264/266; 264/275; 425/127
(58) Field of Classification Search ............ 264/275, 264/247, 279; 425/127
See application file for complete search history.

(56) References Cited

U.S. PATENT DOCUMENTS

| 4,797,244 A | * | 1/1989 | Sauer ............ 264/266 |
| 5,599,608 A | | 2/1997 | Yamamoto et al. |
| 5,746,962 A | | 5/1998 | Yamamoto |
| 5,759,477 A | | 6/1998 | Yamamoto |
| 5,783,287 A | | 7/1998 | Yamamoto et al. |
| 5,912,081 A | | 6/1999 | Negele et al. |

* cited by examiner

*Primary Examiner*—Edmund H. Lee
(74) *Attorney, Agent, or Firm*—Wegman, Hessler & Vanderburg

(57) ABSTRACT

Method for insert molding film covered plastic parts are disclosed that facilitate wrapping of the paint film around edges of the part. A mold cavity (210) is provided wherein the requisite edge extremities (212, 214) of the cavity (210) are provided in an offset or spaced relation to the mold parting line plane (216). Location of the mold extremities at this position helps to secure the paint film in the mold cavity (210) and prevents pinching of the film that would otherwise occur along the mold parting line (216).

8 Claims, 5 Drawing Sheets

INJECTION CO-MOLDING WITH OFFSET PARTING LINE

CROSS-REFERENCE TO RELATED APPLICATIONS

Priority filing benefit of (1) International PCT application PCT/US01/17547 filed May 31, 2001, and published under PCT 21(2) in the English language and (2) U.S. provisional application Ser. No. 60/211,040 filed Jun. 12, 2000.

FIELD OF THE INVENTION

The present invention pertains to improved methods of insert molding a laminated film or the like over a plastic substrate and to the fused film—plastic parts made thereby.

BACKGROUND OF THE INVENTION

A variety of injection molded parts have been made and used for motor vehicle body and trim parts. For example, bumpers, body panels, doors, filler panels, wheel covers, dashboards, arm rests and other parts have been made via injection molding techniques. Additionally, with regard to vehicle exteriors, bodyside moldings, beltline moldings, roof moldings, window moldings, chin spoilers, and rocker panels, etc. are made via injection molding of PVC or other thermoplastic materials.

In order to provide a painted surface for these parts, film lamination techniques have been successfully employed. In accordance with these processes, a paint film laminate is insert molded with the desired thermoplastic to fuse the film over the injection molded part. The resulting injection molded part is ready for assembly without subsequent painting.

The paint film laminate used in these insert molding techniques may comprise a backing sheet of about 0.020" in thickness to which paint layers are adhered. Typically, the backing sheet comprises an extruded thermoplastic sheet.

In such paint film laminates, a paint film comprising a cast dried continuous paint coating, is provided over the backing sheet. The paint film may consist of a monocoat, a clear coat over a base coat, or a clear coat and a base coat with interposed print or design. The paint film, including base coat, clear coat and print or design, if desired, may range from about 0.5-4 mil. in thickness.

The laminated paint films are available, for example, from a variety of manufacturers. The films are typically provided in a roll, unwound and then trimmed to a proper "pre-formed" size and shape, ready for insertion into the injection mold. The preform is usually placed along the cavity side of the mold with the painted side thereof facing the mold cavity surface. In some instances, the preform may be placed along the core side of the mold. The mold is then clamped and the desired molten resin is injected into the mold cavity. Heat and pressure conditions in the mold partially melt the backing sheet and a melt bonding or fusion of the injected resin and film occur. Injection molds used for these processes are rear or edge gated so that the molten resin is directed along the backside of the film.

Although these processes provide significant advantage, they are not without problem. For example, edge portions of the part, such as the longitudinally extending edges of elongated strips used for body moldings and the like, may not be completely covered with the film. Accordingly, these edges reveal the uncovered plastic substrate and provide an aesthetically displeasing appearance since the continuity of the printed surface is interrupted by the unsightly appearance of the underlying plastic substrate.

A variety of methods have been developed to cover the edge portions of these co-molded strips. For example, in accordance with U.S. Pat. Nos. 5,599,608 and 5,783,287 (both of common assignment herewith), the paint film is pre-formed prior to the co-molding step so that the longitudinally extending edge portions thereof have re-entrant dispositions relative to the remaining body of the film. Additionally, as set forth in U.S. Pat. No. 5,746,962 (of common assignment herewith), edgewise extremities of the mold cavity, referred to as "pockets," are provided contiguous to the mold parting line so that, upon co-molding, the desired end of the film positioned in the pocket will be superposed over the molten plastic injected into the pocket. This forms an edge portion of the resulting plastic part wherein the film substantially covers the edge.

The technology reported in the above patents has proven tremendously successful, especially in connection with the manufacture of deep draw or deep dimension parts. However, in the manufacture of relatively flatter trim parts, product reject problems have been encountered due to shifting or rotation of the film in the mold cavity prior to injection of the molten plastic. Additionally, high pressure pinching of the film between the male and female mold platens along the mold parting line also results in undesirable product rejects.

With respect to this latter problem, the high pinching force (usually on the order of about 600 tons) can result in a serrated or feathered edge appearance of the film laminate along the edge of the plastic part thereby leading to the requirement of an additional labor-intensive product trimming step so that the product can comply with stringent product quality standards.

SUMMARY OF THE INVENTION

Briefly, improvement in prior art techniques is provided by utilization of a specific mold cavity structure which facilitates wrapping of the paint film around the desired edge portion of the plastic part while minimizing the chance that the film will shift or rotate out of proper alignment in the mold cavity. Additionally, the cavity structure provides for a distinct physical separation of the edge extremity of the mold cavity from the mold parting line. This feature helps to minimize high pressure pinching of the film edge that may otherwise occur in the high pressure nip location existing at the mold parting line.

More specifically, the mold comprises a male, core portion and a female concavity portion. Together, the space between the core portion surface and concavity surfaces defines a mold cavity adapted for receipt of a paint film laminate therein normally positioned with its show surface facing the concavity. As per conventional practice, the sprue and gating are attached to the core side of the mold. Of course, the relative positioning of the film in the mold cavity and the direction of the plastic entry and flow into the mold cavity could be easily switched.

A mold parting line is defined by the mating surfaces of the male and female mold portions. An extremity of the mold cavity is provided in one of the mold surfaces, typically in the core portion. This extremity upon completion of molding, will form an edge of the desired plastic part. This extremity is referred to herein as a wrap around surface.

In contrast to prior art structures and methods in which the mold extremity is located along or is contiguous with the parting line of the mold, the wrap around surface in accordance with the invention is offset or spaced from the mold parting line as measured along a vector perpendicularly oriented with respect to the plane defined by the mold parting line.

Molten plastic is inserted into the mold cavity and is directed against the wrap around surface and the paint film end positioned at this extremity of the mold cavity. The paint film end will pivot along the wrap around surface to thereby form the desired plastic part wherein an edge portion of the plastic will be substantially covered or wrapped by overlying paint film.

The invention will be further described in conjunction with the appended drawings and following detailed description.

DRAWINGS

DETAILED DESCRIPTION

Figure 6:
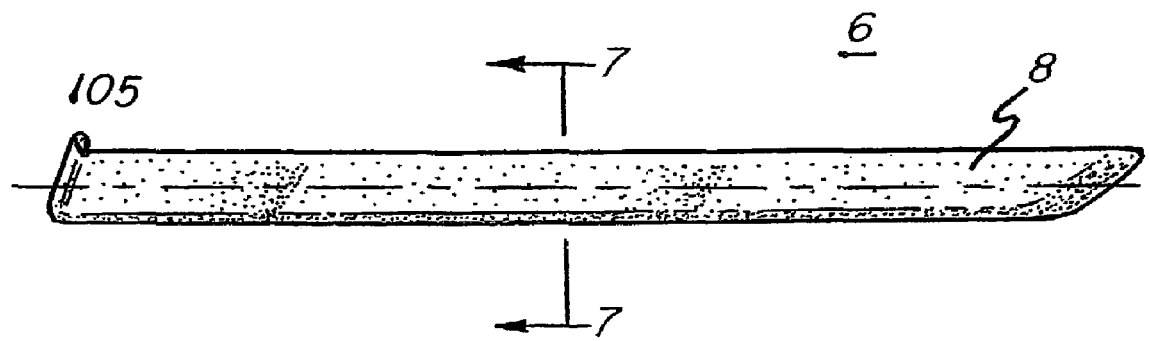
FIG. 6 is a plan view of a paint film covered plastic trim part made in accordance with the invention.
Figure 7:
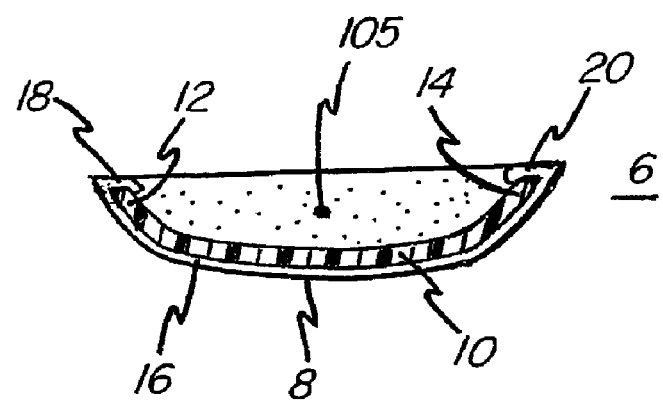
FIG. 7 is a transverse cross sectional view of the trim part shown in FIG. 6, taken along the lines and arrows 7-7 of FIG. 6.

Turning first to FIGS. 6 and 7 of the Application, there is shown a trim part such as a bodyside molding member 6 made in accordance with the invention. The trim part 6 is elongated and presents an aesthetically pleasing appearance due to the provision of the show side 8 of paint film laminate over the plastic substrate 10.

As can be best seen in FIG. 7, the longitudinally extending edges 12, 14 of the substrate 10 are completely covered or wrapped around at wrapped edges 18, 20, by the paint film 16. The part shown in FIGS. 6 and 7 is provided in accordance with the instant co-molding process as shall be set forth hereinafter.

Figure 1:
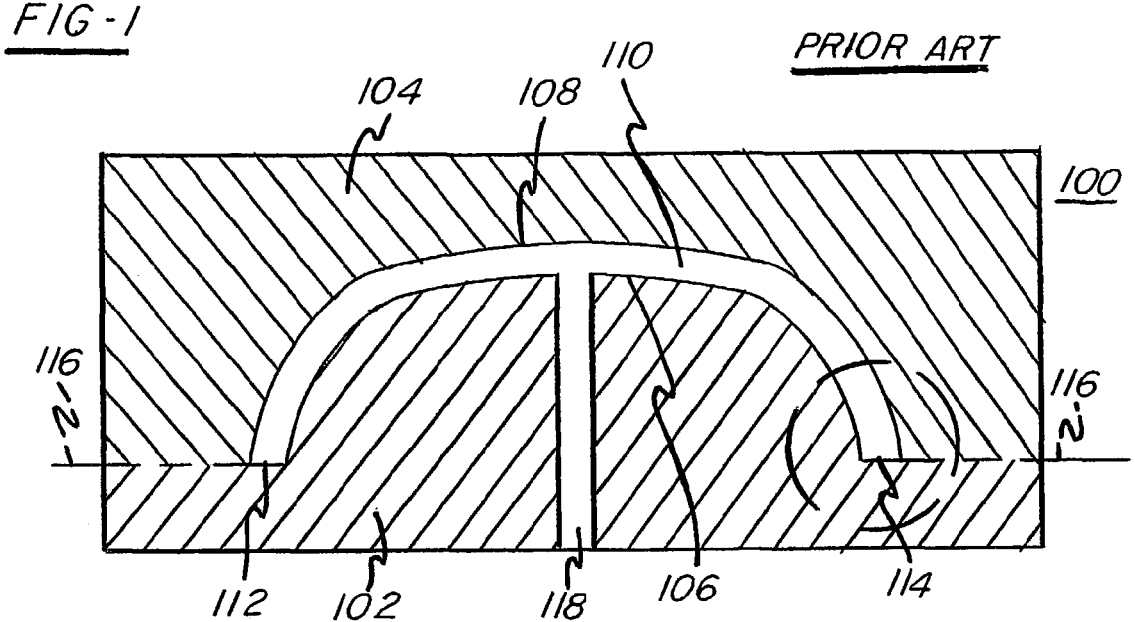
FIG. 1 is a sectional view of a prior art mold cavity.

Turning now to FIG. 1 of the invention, there is shown a prior art mold of the type utilized to produce plastic parts. Here, the mold 100 comprises a male core member 102 and cooperating female member 104. The male mold member comprises a convex core surface 106 which cooperates with the female concave surface 108 to, therebetween, define a mold cavity 110 in which the paint film covered parts are made.

The longitudinal extending edge extremities of the mold cavity are provided as a pair of surfaces which will extend longitudinally along the finished, molded elongated part. Here, left hand extremity 112 and right hand extremity 114 are provided. Note that both of these extremities are contiguous with the horizontally disposed part line of the mold shown at 116.

With further regard to FIG. 1, sprue 118 is in communication with a source of molten plastic so that it may serve as an entry location for plastic flow into the mold cavity.

The step of co-molding itself is not new. In accordance with traditional co-molding techniques, the paint film laminate is first placed in the mold cavity, typically with the show side of the paint film laminate contiguous to or spaced closely from the concave surface 108 presented by the female portion of the mold. Then, plastic is injected through the sprue, and fills the mold so that the resulting co-molded part consists of a plastic substrate covered by paint film laminate along the face and edges of the substrate.

Figure 2:
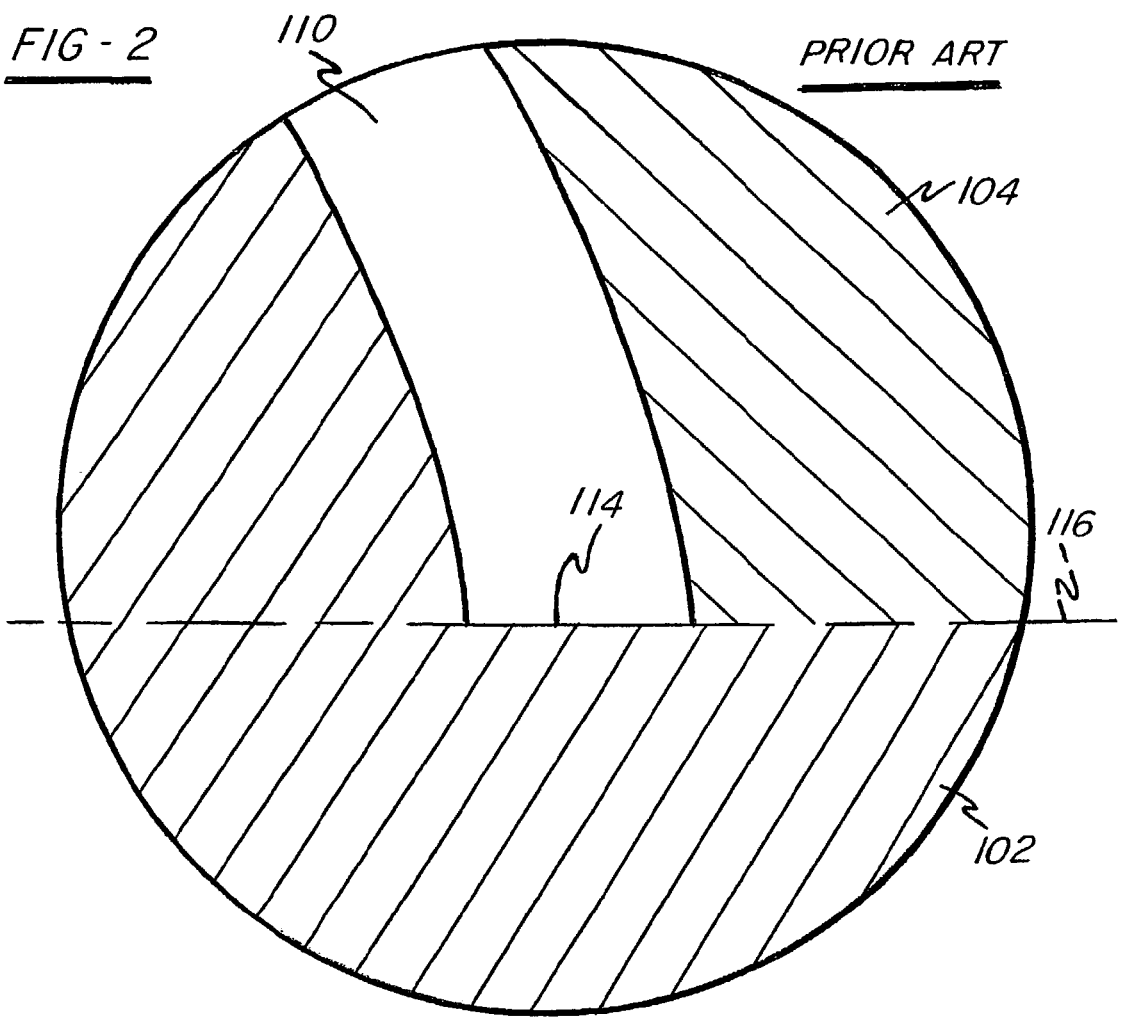
FIG. 2 is a magnified sectional view of a portion of the prior art mold cavity shown in FIG. 1.

As shown in FIG. 2, the right hand extremity 114 of the prior art mold cavity is contiguous with the parting line of the mold 116, in accordance with prior art processes and structures.

Figure 3:
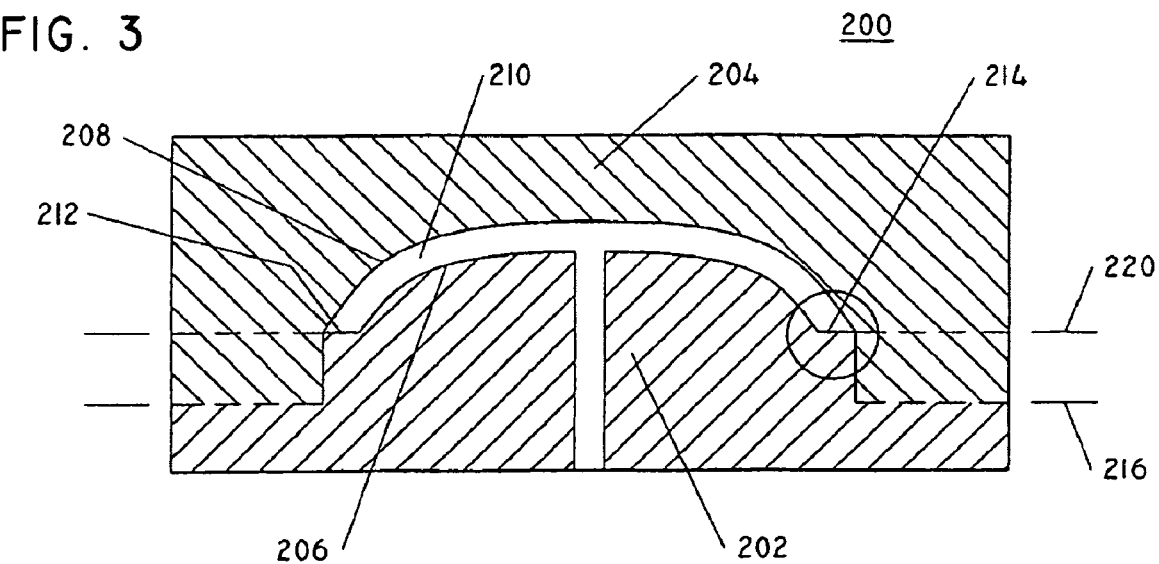
FIG. 3 is a sectional view of a preferred mold cavity in accordance with the invention.

FIG. 3 of the drawings depicts a mold cavity made in accordance with the invention. Here, the mold 200 comprises core member 202 and cooperating female member 204. The male core surface is shown at 206 with the cooperating surface of the female mold member shown at 208. Between the members 206 and 208, a mold cavity 210 in accordance with the invention is provided. Here, the left hand and right hand edge extremities of the mold cavity 212, 214 respectively, are off set from the part line 216 of the mold. That is, the edge extremities 212, 214 are spaced from the part line 216 as would be measured along a vector positioned perpendicular to the part line 216. Instead, the edge extremities 212, 214, as shown herein, are contiguous with the plane provided along part line 220 of the part. Sprue 218 serves as an entry location for flow of injected plastic into the mold cavity.

Location of the edge extremities 212, 214, in an off set or spaced position from the part line of mold 216 has provided distinct advantage. Especially when the desired part is a shallow one, heretofore, the paint film, when positioned in the mold cavity, tended to shift and in some cases fell out of the mold cavity. Here, the shifting or rotation of the paint film, will be corrected by pivoting of the edgewise portion of the paint film against the extremities 212, 214, which are also referred to as wrap around surfaces herein. Further, in many of the prior art processes, in which these edgewise extremities of the mold are located contiguous to the mold parting line, misaligned paint film, in accordance with the prior art processes, tended to shift into the nip between the mold parting line, and these edges were then subjected to excessive pressure forces and formed deleterious, feathered or serrated edges.

In accordance with the invention, the pressures encountered at the part line of the part 220 are much less than those experienced at the part line of the mold 216, so the tendency to form feathered or serrated edges is accordingly minimized.

Figure 4:
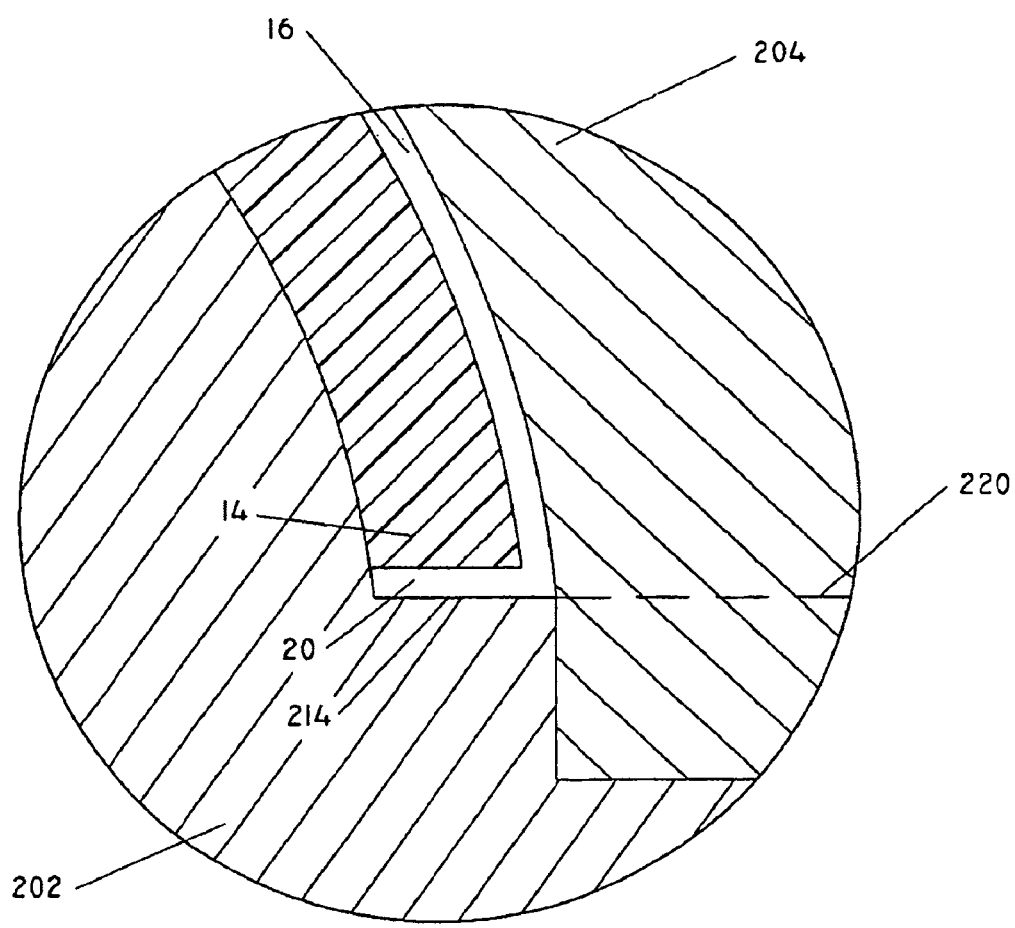
FIG. 4 is a magnified sectional view of a portion of the mold cavity shown in FIG. 3 shown with a co-molded paint film laminate and underlying plastic material therein.

Turning now to FIG. 4, there is shown a magnified sectional view of a part in accordance with an invention shown in its position in the mold, prior to opening of the mold for part ejection. The view here is taken of a co-molded part in which a paint film has been fusingly bonded by the molding process over the plastic injected into the mold. Here, the edge 14 of the part is completely wrapped around or covered by paint film 16 as shown at 20. The wrap around edge 214 of the male or core surface is coplaner and contiguous with the part line 220 of the part.

Figure 4A:
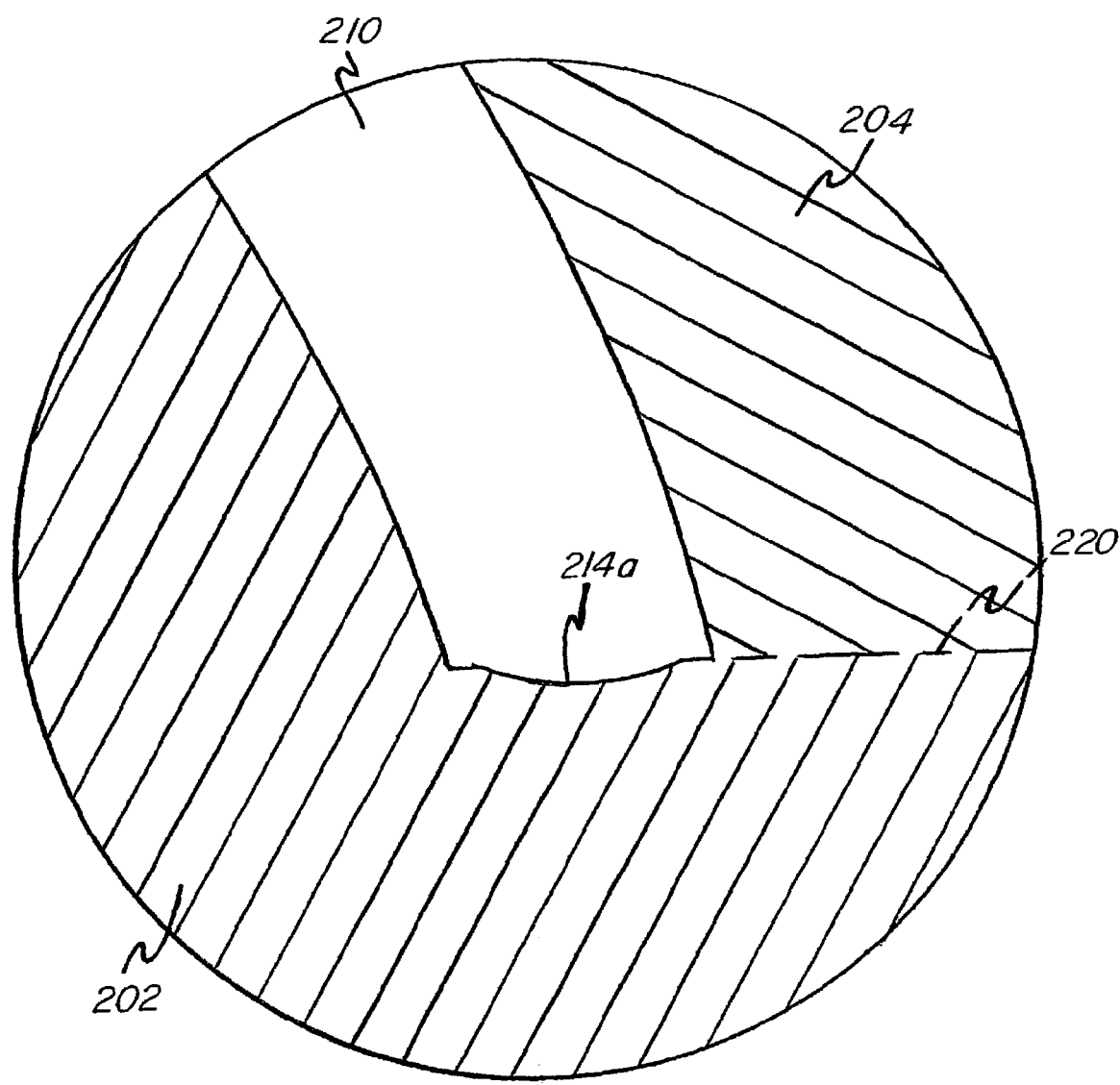
FIG. 4a is a magnified sectional view of a mold cavity in accordance with another embodiment of the invention.

Another embodiment is shown in FIG. 4a, wherein the wrap around surface comprises a concavity 214a contiguous with the part line 220 of the part, spaced above the part line of the mold 216 (FIG. 3).

Figure 5:
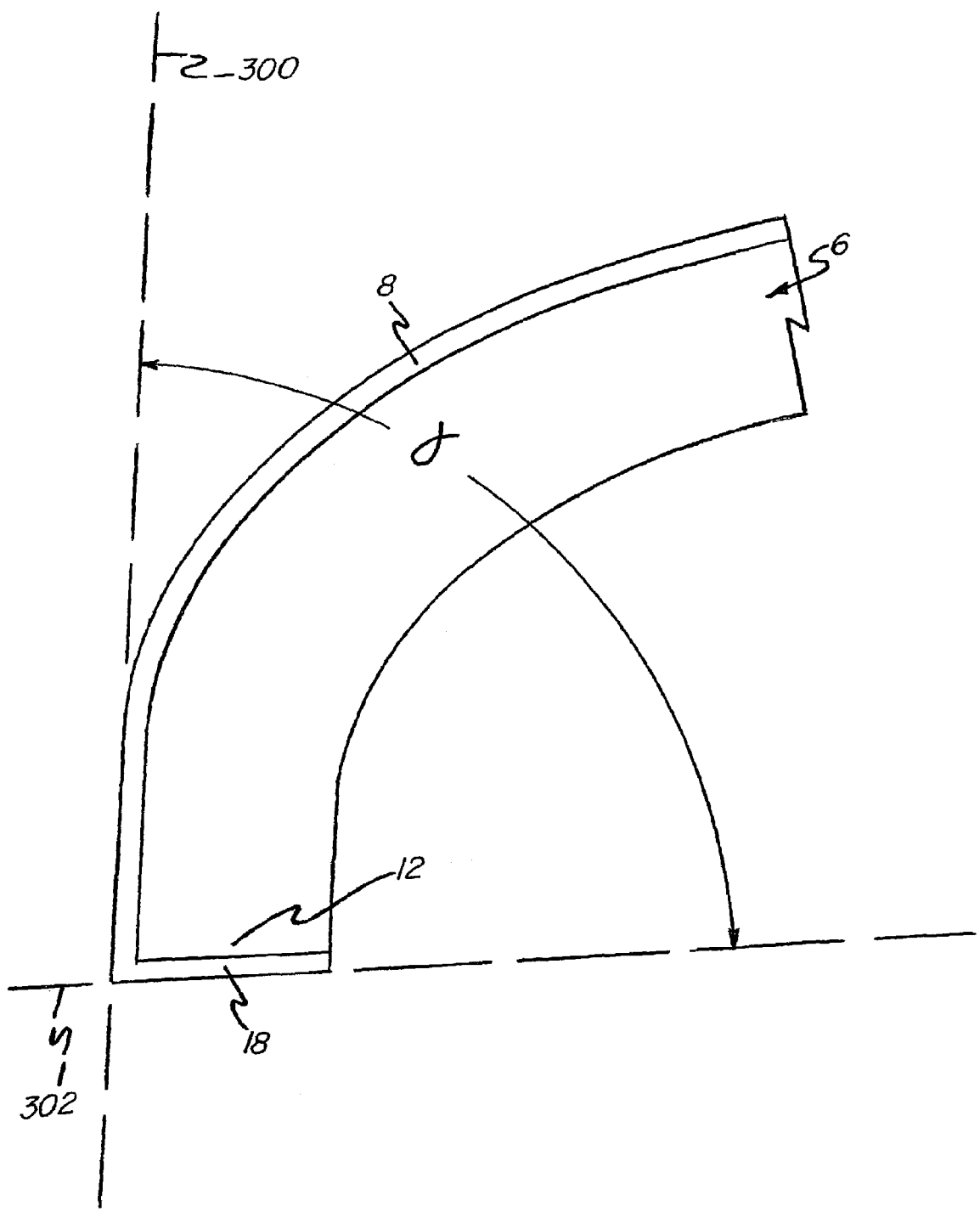
FIG. 5 is a magnified sectional view of a portion of a paint film laminate covered plastic trim part made in accordance with the invention.

In accordance with the invention, it is possible to provide parts of the type shown in FIG. 5 wherein an angle ∝ of less than 90 degrees is provided between vertices 300, 302. Vertex 300 represents a tangent touching the curved surface of the part existing on the face or show side of the part, adjacent to the left hand longitudinal edge 18 of the part 6. Vertex 302 represents the plane presented by the edge 18 of the part. Note that the edge 18 of the part as represented by the vertex 302 is straight or planar. This edge extends parallel to the longitudinal axis 105 of the part 6 as shown in FIGS. 6 and 7. Accordingly, by use of the methods and mold cavity structure reported herein, the pair of longitudinally extending edges 12 and 14 are flat (not rounded) and are completely wrapped or covered with paint film 18, 20.

Having described the invention in detail and by reference to preferred embodiments thereof, it will be apparent that modifications and variations are possible without departing from the scope of the invention defined in the appended claims.

What is claimed is:

1. Method of making a plastic part by insert molding of a paint film over a plastic substrate, comprising
   (a) providing a male mold member including a core portion and a female mold member having a surface defining concavity therein, said male mold member and said female mold member defining a mold cavity therebetween and mating along a generally planar parting line, said male mold member comprising an injection port extending through said male mold member and communicating with said cavity, at least one wrap around surface disposed at an extremity of said mold cavity and spaced from said parting line, said female mold member comprising an outer boundary edge along said mold cavity and forming an intersection with said wrap around surface, a solid boundary contiguous to said wrap around surface positioned at said intersection, said solid boundary extending through a plane coextensive with said wrap around surface that extends laterally therefrom through said outer boundary edge;
   (b) providing a paint film having a dried paint coating, inserting said paint film into said mold cavity and positioning an end of said film adjacent said wrap around surface; and
   (c) injecting molten plastic through said injection port and into said mold cavity and directing said molten plastic against said wrap around surface and against said film end positioned adjacent said wrap around surface whereby said film is wrapped around said molten plastic positioned adjacent said wrap around surface.

2. Method as recited in claim 1 further comprising providing said at least one wrap around surface along a plane generally parallel to said parting line plane.

3. Method as recited in claim 1 comprising providing a pair of wrap around surfaces, each said wrap around surface located along an opposite edgewise extremity of said mold cavity.

4. Method as recited in claim 1 wherein said wrap around surface is in the form of a concavity.

5. Method as recited in claim 1 wherein said wrap around surface is substantially planar.

6. Method as recited in claim 1 wherein said wrap around surface is provided on said core portion.

7. A method as recited in claim 1 wherein a tangent touching said outer boundary edge of said female mold member forms an angle of less than 90° with said plane.

8. A method as recited in claim 1 wherein said end of said film positioned adjacent said wrap around surface extends substantially parallel to said wrap around surface, with said dried paint coating touching said wrap around surface.

* * * * *